United States Patent
Ursenbach et al.

(10) Patent No.: US 6,658,238 B1
(45) Date of Patent: Dec. 2, 2003

(54) METHOD FOR ELABORATING A TRANSMISSION SIGNAL AND TRANSMITTER WITH AMPLIFYING CELLS FOR IMPLEMENTING SAME

(75) Inventors: François Ursenbach, Eaubonne (FR); Arnaud de Grammont, Chalons s/Marne (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/720,261

(22) PCT Filed: Jul. 2, 1999

(86) PCT No.: PCT/FR99/01599

§ 371 (c)(1), (2), (4) Date: Jan. 1, 2001

(87) PCT Pub. No.: WO00/03489

PCT Pub. Date: Jan. 20, 2000

(30) Foreign Application Priority Data

Jul. 10, 1998  (FR) ............................................. 98 08925

(51) Int. Cl.[7] ................................................. H04B 1/02
(52) U.S. Cl. ....................... 455/102; 455/103; 455/108; 455/127.2; 455/114.4
(58) Field of Search ................................. 455/522, 102, 455/63.1, 114.2, 114.4, 127.1, 127.2, 108, 103; 330/110, 202, 251

(56) References Cited

U.S. PATENT DOCUMENTS

| | | | |
|---|---|---|---|
| 3,646,482 A | | 2/1972 | Ursenbach |
| 3,928,806 A | | 12/1975 | Carter et al. |
| 4,403,197 A | * | 9/1983 | Swanson ...................... 330/10 |
| 4,451,832 A | * | 5/1984 | Stites ......................... 455/103 |
| 5,194,835 A | | 3/1993 | Destrade |
| 5,454,013 A | * | 9/1995 | Minami et al. ............. 455/108 |
| 5,469,127 A | * | 11/1995 | Hulick et al. ............... 455/102 |
| 5,578,971 A | * | 11/1996 | Minami et al. ............... 330/10 |
| 5,808,511 A | * | 9/1998 | Kobayashi .................. 330/149 |
| 6,041,082 A | * | 3/2000 | Takeda et al. .............. 455/108 |

FOREIGN PATENT DOCUMENTS

EP          0 583 175        2/1994

* cited by examiner

Primary Examiner—Quochien Vuong
Assistant Examiner—Lana Le
(74) Attorney, Agent, or Firm—Oblon, Spivak, McClelland, Maier & Neustadt, P.C.

(57) ABSTRACT

Transmitter systems in which an output signal is obtained by the summation of signals with predetermined discreet levels given by several amplification cells. Given a signal to be sent with an amplitude A and a phase $\phi_0$, a control circuit determines ($\alpha$) a number of amplification cells sufficient to obtain slightly more than the value A with the phase $\phi_0$ but to carry out a phase adjustment ($\beta$) such that at least two of the cells are phase-shifted, one in advance and the other delayed with respect to $\phi_0$, so that the total sum of the signals delivered by the cells gives the signal A, $\phi_0$. Such transmission may find particular application to amplification cell transmitters with discrete output levels.

7 Claims, 5 Drawing Sheets

METHOD FOR ELABORATING A TRANSMISSION SIGNAL AND TRANSMITTER WITH AMPLIFYING CELLS FOR IMPLEMENTING SAME

BACKGROUND OF THE INVENTION

1. Field of the Invention

The present invention relates to the summation of the power values coming from several amplification cells for the supply, at a single output, of a transmission signal.

2. Discussion of the Background

The total efficiency of a transmitter depends on the efficiency of the amplification cells themselves as well as the power lost in the different steps of recombination of the elementary power values given by these same cells. It is possible to bring these two points into play to improve the total performance characteristics of the transmitter. However, it is necessary to comply with the requirements of amplitude and phase linearity as well as the functions required of transmitters, such as the interchangeable character of the modules during operation and their standardization.

Class A amplifiers, namely amplifiers whose transistors or other amplifiers components are conductive for 100% of the time, give the most linear signal at output but with a relatively mediocre efficiency. To improve this efficiency, it is possible to make these transistors work in class AB mode with push-pull type assemblies. These assemblies are quasi-linear but the efficiency remains low. In this type of assembly, it is the modulated signal that is amplified.

Amplifiers working in class C mode or, better still, selection-switching mode have an ideal efficiency close to 1. It is therefore valuable to use this type of assembly to obtain high overall efficiency. There are transmitters where the working of all or part of the amplifier cells is controlled to give the amplitude-modulated and phase-modulated output signal in certain discrete levels in order to obtain the constellation of the digital signal to be transmitted. This type of assembly does not give a continuous output signal and, often, the efficiency of the recombination is not optimized.

There are transmitters implementing amplification cells with different elementary power values. A power of any value may then be subdivided more finely on the basis of the power values available. These assemblies require a large number of different types of cells giving rise to high cost price. Here again, the recombination efficiency is not optimized.

There also exist radio-broadcasting amplifiers with amplification cells that are all identical, working in class C mode. The modulation is obtained by the addition of the elementary voltages of each cell. For this purpose, the cells may or may not deliver a voltage, along a bar, by inductive coupling. In this type of device, the cells are interdependent. This rules out the replacement of faulty cells, if any, during the working of the transmitter.

It is aim of the present invention to prevent or at least reduce the drawbacks referred to here above.

SUMMARY OF THE INVENTION

This is obtained by an amplitude and phase control of the amplification cells, each capable of giving at least two output levels.

The invention proposes, to this end, a method for preparing a transmission signal with an instantaneous amplitude A and an instantaneous phase $\phi_0$, by means of n amplification cells, with n as a whole number at least equal to 2, each amplification cell giving a whole number, at least equal to 2, of output discrete levels, including the level zero, characterized in that, considering the primary vector of the modulus A with an argument $\phi_0$, it consists in determining n secondary vectors with a vector sum equal to the primary vector, these secondary vectors being chosen in a one-to-one relationship with the n cells and each having a modulus with a value corresponding to one of the discrete levels of the cell with which it is in a one-to-one relationship and a phase, in controlling each of the n cells so that it gives a signal with instantaneous amplitude and phase whose values correspond respectively to the values of the modulus and of the argument of the secondary vector in a one-to-one relationship with the cell considered and in summing up, in an energy-coupling device, the signals given by the n cells.

According to the invention, there is also proposed a transmitter for the transmission of a signal with an instantaneous amplitude A and an instantaneous phase $\phi_0$ comprising a radiofrequency oscillator, n amplification cells with n as a whole number at least equal to 2, each amplification cell giving a finite whole number, at least equal to 2, of output levels, including the zero level, a transmission antenna and an energy-coupling device to couple the antenna cells, characterized in that it comprises computation means to determine n vectors in a one-to-one relationship with the n cells such that their sum is equal to a vector with a modulus A and an argument $\phi_0$ and in that the modulus of each of them has a value equal to the value of one of the discrete levels of the cell with which the vector is in a one-to-one relationship, amplitude control means to impose, on each cell, the discrete level thus defined by the modulus of the vector associated with the cell considered and phase control means in order to impose on each cell, from the phase of the oscillator, a phase shift equal to the argument of the vector associated with the cell considered.

BRIEF DESCRIPTION OF THE DRAWINGS

The present invention will be understood more clearly and other features shall appear from the following description and the appended figures, of which.

DESCRIPTION OF THE PREFERRED EMBODIMENTS

Figure 1:
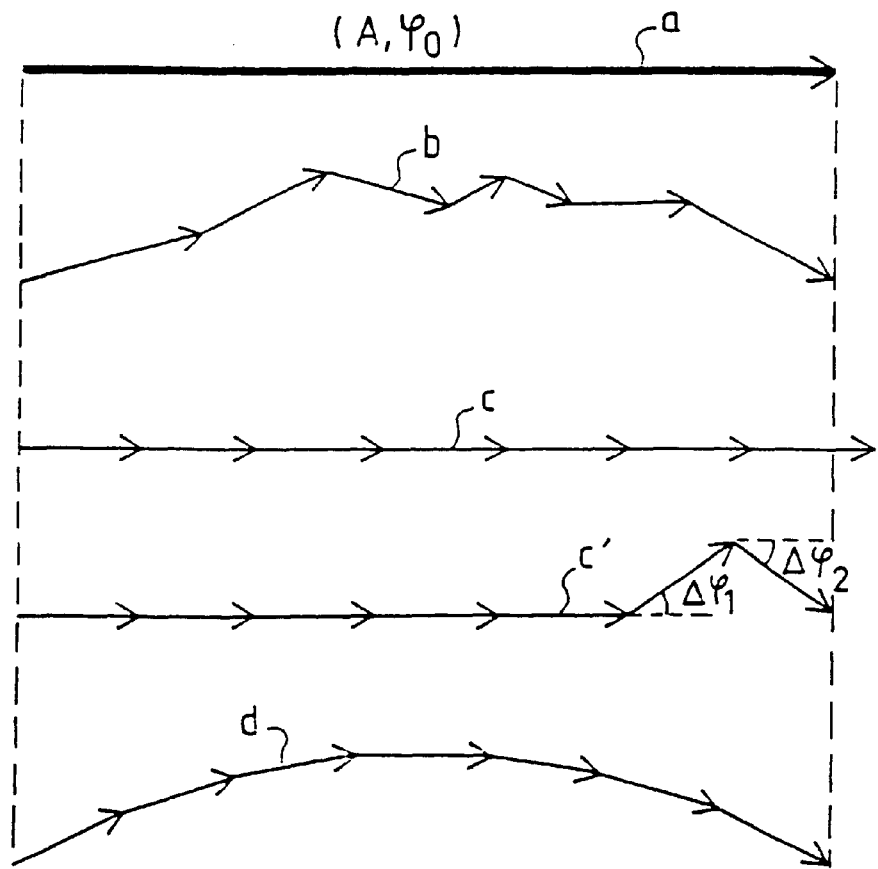
FIGS. 1 and 2 are vector views of a transmission signal to be obtained and of ways to obtain it.

FIG. 1 is a vector view showing, at the reference a, a first vector with a modulus A and an argument $\phi_0$. At b, a set of seven vectors with different moduli and arguments is chosen so that the sum of these vectors gives the first vector (A, $\phi_0$). At c, a set of seven vectors of identical moduli and arguments all equal to $\phi$ is chosen in such a way that the sum of these vectors gives a vector whose argument is, of course, equal to $\phi_0$ but whose modulus is greater than A by a value smaller than the modulus of each of the seven vectors. At c', there is shown a group of seven vectors, five of which are identical to the seven vectors shown at c while the other two have phases ($\phi_0 + \Delta\phi_1$ and $\phi_0 + \Delta\phi_2$ with $\Delta\phi_1 = -\Delta\phi_2$ such that the sum of the seven vectors gives the first vector.

These vectors used give a first explanation of the invention. Let it be assumed, indeed, that at output of a transmitter equipped with amplification cells, a signal with an instantaneous value (A, $\phi_0$) has to be supplied. A first way to achieve this result, which is very general but can be improved, is illustrated at b in FIG. 1. It consists in seeing to it that a part of the amplification cells, seven in the case represented, give instantaneous signals whose amplitudes-phases correspond respectively to the moduli-arguments of the seven vectors. This first method can be improved as shown at c' in FIG. 1. For this purpose, among the cells which are all identical, and only capable of giving two values including the value zero, a sufficient number of them is chosen, seven in the case shown, to give instantaneous signals whose amplitudes-phases correspond to the moduli-arguments of the seven vectors represented at c'.

Various alternative embodiments may be proposed to prepare the signal (A, $\phi_0$). In particular, a variant that is useful for the case illustrated at c' in FIG. 1, consists, while using cells that are quite identical, in choosing cells capable of giving more than two distinct levels. This is the case in the transmitter which will serve as an example for the rest of the description. In this transmitter, the amplification cells, which are all identical, have three distinct levels including the level zero. This reduces the value of the phase shifts $\Delta\phi_0$, $\Delta\phi_2$ referred to with reference to the illustration c' of FIG. 1 and these values will not be the same, except for the sign, unless the two cells which are controlled to present instantaneous phases $\phi_0+\Delta\phi_1$ and $\phi_0+\Delta\phi_2$ are controlled to give the same level.

These additional phase shifts $\Delta\phi_1$ and $\Delta\phi_2$, respectively imposed on two cells, are used to prepare the signal (A, $\phi_0$) with precision. As an alternative, the phase shifts needed to obtain the signal (A, $\phi_0$) may be distributed among the cells chosen. This method is illustrated at d in FIG. 1. Here, unlike the illustration b of FIG. 1, the additional phase shifts are optimized, i.e. reduced to the minimum given the signal (A, $\phi_0$) to be prepared. It must be noted that the illustration along d refers to cells which, at least at the instant considered, all give one and the same amplitude of the signal. Here again, distinct levels, numbering more than two, may be used.

It is necessary to mention two special cases that may occur during the preparation of the transmission signal (A, $\phi_0$). The first of these cases is the one where the sum of the amplitudes chosen in the selected cells corresponds exactly to the desired amplitude A. In this case naturally, there is no need to bring into play additional phase shifts such as the phase shifts $\Delta\phi_1$, $\Delta\phi_2$ encountered further above in this document. However this is only a transitional situation in the preparation of a transmission signal whose instantaneous value (A, $\phi_0$) requires the use of additional phase shifts. The second of these cases is the one where the lowest of the non-zero levels prepared by the amplification cells is greater than the instantaneous amplitude A desired. In this case, the choice, instead of pertaining to a single cell, must pertain to two cells as in the vector illustration shown in FIG. 2. This FIG. 2 corresponds to the preparation of the signal (A, $\phi_0$) from two cells that give signals that have the same levels but are phase shifted.

Figure 3:
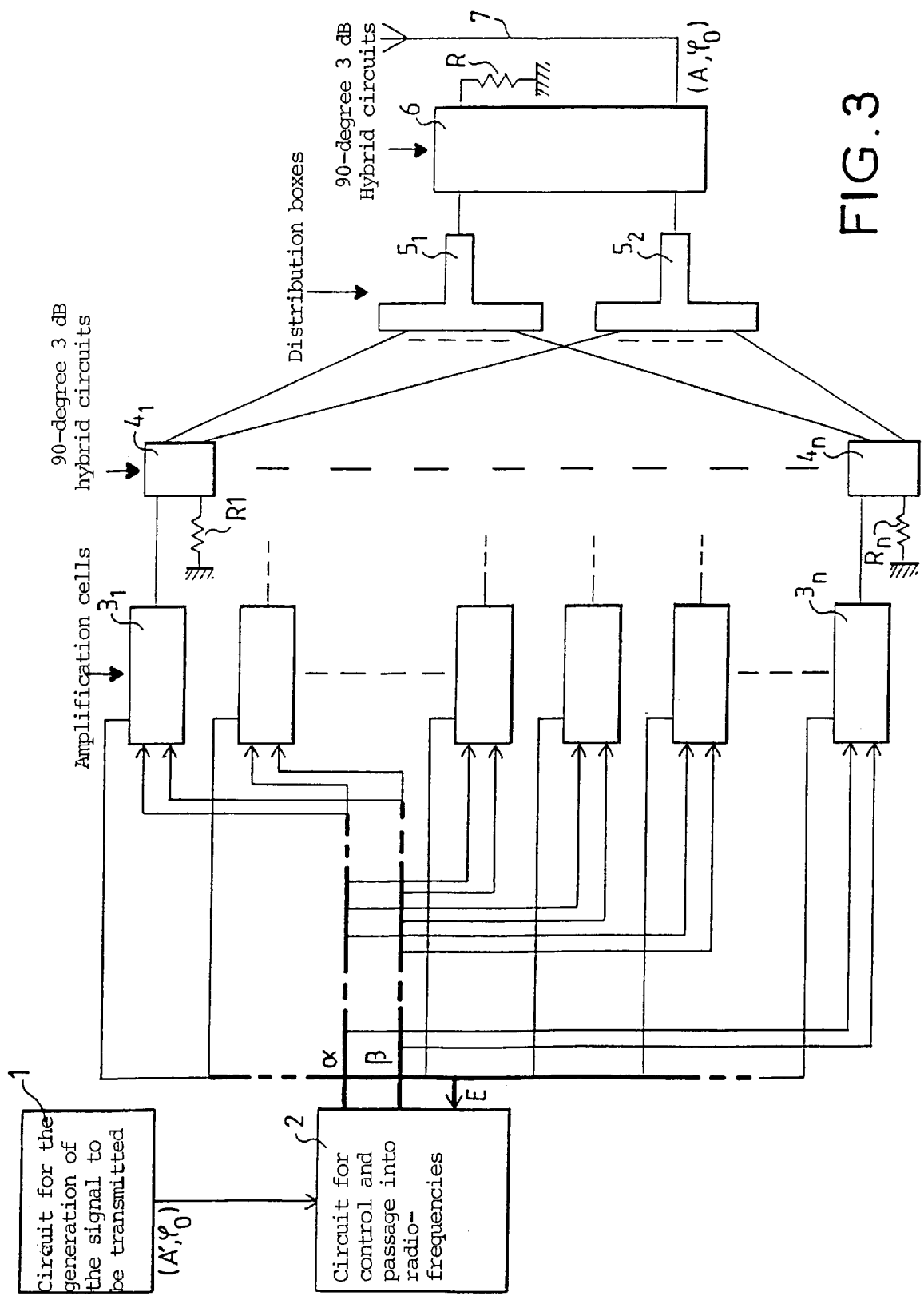
FIG. 3 is a partial schematic view of a transmitter according to the invention.

FIG. 3 shows a transmitter which, inter alia, comprises a digital circuit 1 for the generation of amplitude characteristics, A', and phase characteristics, $\phi_0$, of the signal to be transmitted and an antenna 7. The part of the transmitter corresponding to the invention is the one contained between the circuit 1 and the antenna 7. It comprises a circuit 2 for control and passage into radiofrequencies, n amplification cells $3_1$ to $3_n$ and an energy-coupling device formed by 90-degree 3 dB hybrid circuits $4_1$ to $4_n$, 6, two distribution boxes $5_1$, $5_2$ and balancing resistors R1–Rn,R.

The energy-coupling device is described in the French patent 2 625 053 filed on Dec. 18, 1987 and in various other corresponding patents including the U.S. Pat. No. 5,194,835. It is this device that is used in the transmitter serving as an example for the present description. It has the advantage of maintaining perfect decoupling between the different ports in a wide range of frequencies. However, depending on the range of frequencies considered and the desired bandwidth, other energy-decoupling devices may be used such as distribution boxes associated with ferrite circulators, cascade-mounted hybrid couplers, Wilkinson type assemblies, etc.

The circuit 2 according to FIG. 3 receives the instantaneous values A', $\phi_0$ of the signal to be prepared from the circuit 1. It also receives signals E from the amplification cells $3_1$ to $3_n$, informing it on the state of these cells, namely whether the operation is correct or defective. Depending on the value A', it chooses a certain number of cells from among the cells whose operation is correct and gives each one of them an indication of the level $\alpha$ and the phase $\beta$ of the signal that it must deliver.

In the transmitter used as an example for the present description, the total number n of amplification cells being 16, these cells were all identical and gave three discrete levels, including the zero level.

Figure 4:
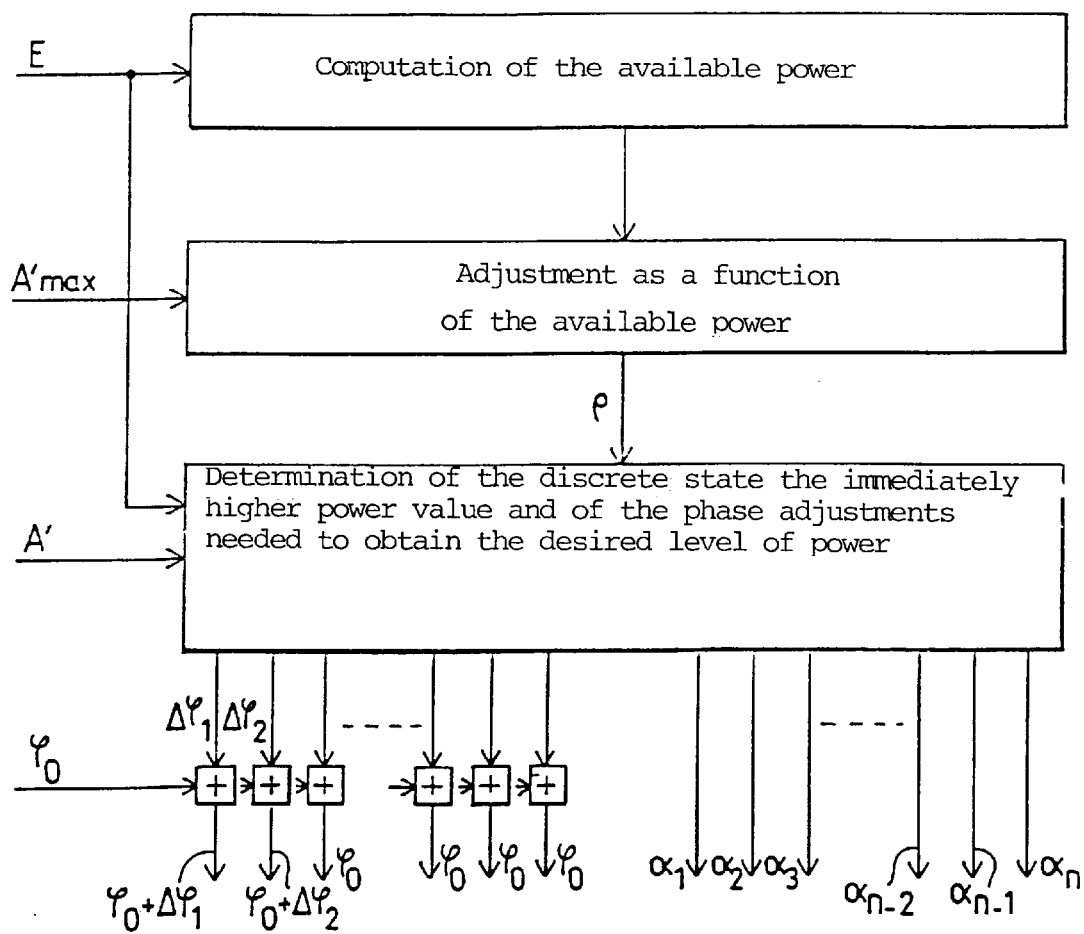
FIG. 4 is a computation algorithm pertaining to one of the elements of the transmitter according to FIG. 2, FIGS. 5 and 6 are diagrams of two of the elements of the transmitter according to FIG. 2.

FIG. 4 is a computation algorithm pertaining to the circuit 2 of FIG. 3.

With knowledge, through the signals E, of the state of each of the amplification cells, a computation of the maximum power available Pmax is made, taking account of the defective cells if any. Furthermore, with knowledge of the maximum value A'max that may be reached by A', and, therefore, with knowledge of the desired output power P'max corresponding to A'max, an adjustment of the maximum output power of the transmitter is made. This adjustment consists in providing a coefficient of proportionality P. The product P.A' gives the value A referred to here above. This coefficient $\rho$ keeps the value 1 so long as the power $\rho$'max corresponding to A'max is at most equal to the maximum power available Pmax. When P'max becomes greater than Pmax, the coefficient $\rho$ takes a value below 1, equal to the square root of the ratio Pmax/P'max.

Figure 2:
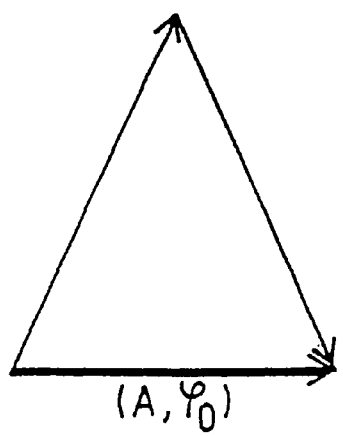

Knowing P and A', and therefore A, the discrete levels per cell are determined, corresponding to a power value equal to or slightly greater than the desired power. This corresponds to the illustration c in FIG. 1 but, in the example described, the non-zero vectors are not necessarily equal, given that, if the cells are identical, they propose not two but three discrete levels at their output. It must be noted however that, despite this possibility of choice between three levels per amplification cell, an additional condition is laid down, in the example described, for the determination of the levels, namely a limitation of choice to two distinct consecutive levels: the level 0 and 1 or 1 and 2 if the levels are listed 0, 1, 2 in increasing order. This additional condition is designed to give a better balance in the distribution of the power values applied to the inputs of the energy-coupling device. The example according to FIG. 2 is processed in this step of the computation algorithm. The additional conditions in which the choice is limited to two distinct levels may also be applied to amplification cells that are all identical but have more than three distinct levels.

Digital signals $\alpha_1$ to $\alpha_n$ are sent to the n cells to control the discrete levels chosen, both zero and non-zero.

At the same time, to obtain the adjustment by the phase, as illustrated in c' in FIG. 1, the angles $\Delta\phi_1$ and $\Delta\phi_2$ are computed for two of the selected cells.

With $\phi_0$ being known, this value is addressed to n−2 of the cells in the form of a digital control signal $\beta_3$ to $\beta_n$. The two cells used for the adjustment by the phase receive, for their part, respectively digital control signals $\beta_1$ and $\beta_2$ with a phase $\phi_0+\Delta\phi_1$ and $\phi_0+\Delta\phi_2$. It is assumed here and in the algorithm according to FIG. 3 that, for the instantaneous signal A, $\phi_0$ considered, it is the first two cells that are used to obtain the phase adjustment. However, naturally for another instantaneous signal to be given, other cells could have been chosen to make the adjustment by the phase especially if one and/or the other of these two first amplification cells were to be defective.

Figure 5:
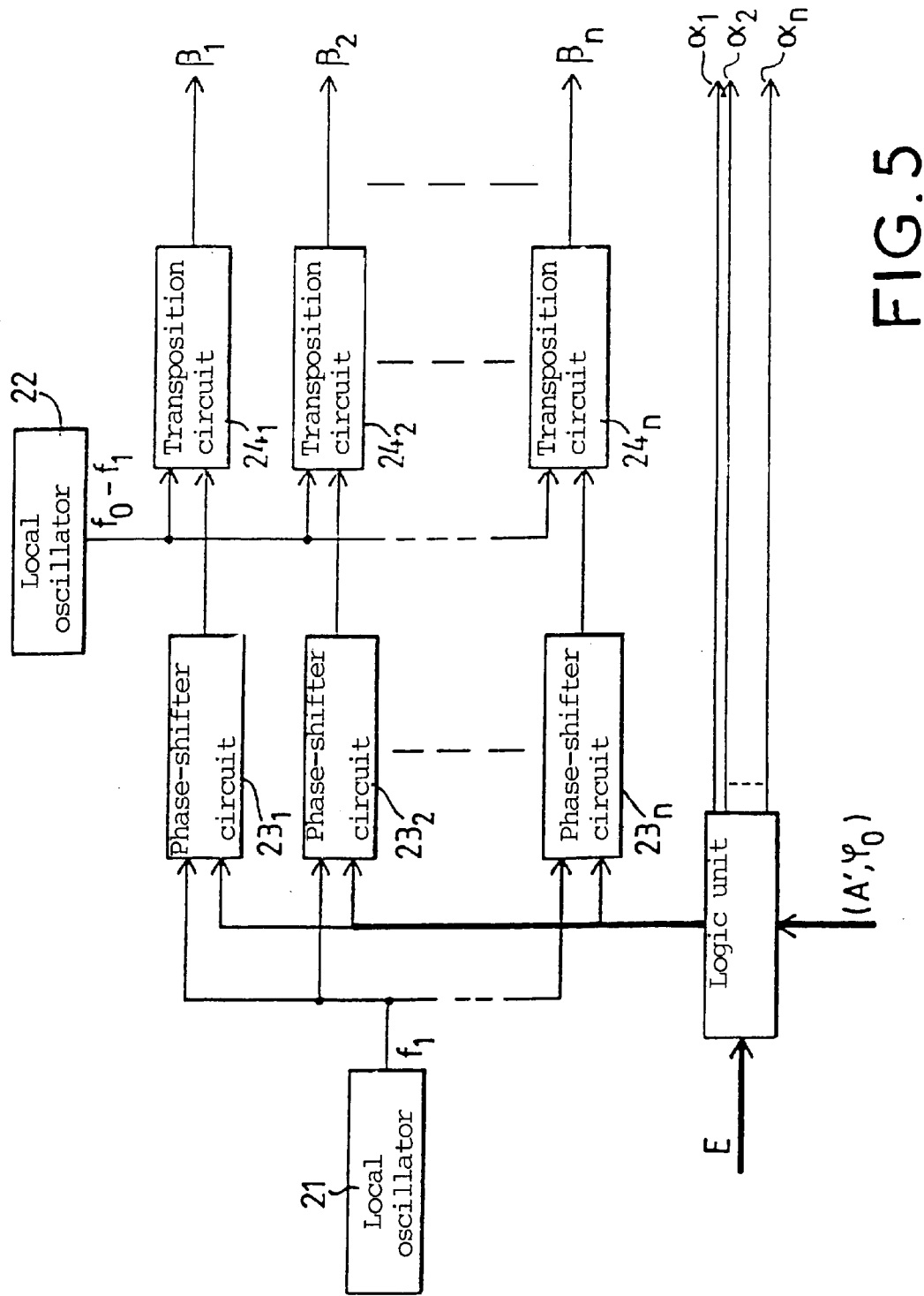

FIG. 5 is a detailed diagram of the circuit 2 according to FIG. 3. It shows a logic unit 20 constituted by a microcomputer that receives the characteristics A', $\phi_0$ of the instantaneous signal to be transmitted, as well as the signal E on the state of the amplification cells.

As indicated especially by means of the algorithm according to FIG. 4, the logic unit 20 determines the digital signals $\alpha_1$ to $\alpha_n$ to control the operating state of the amplification cells $3_1$ to $3_n$ shown in FIG. 3.

To prepare the phase-shift control signals $\beta_1$ to $\beta_n$ of the amplification cells, the circuit 2 according to the invention comprises phase-shifter circuits $23_1$ to $23_n$ followed respectively by frequency transposition circuits $24_1$ to $24_n$.

The phase-shifts are prepared in intermediate frequency by means of the phase-shifter circuits $23_1$ to $23_n$ and then transposed into radiofrequency by the transposition circuits. The phase-shifter circuits, for this purpose, receive an intermediate frequency signal $f_1$ from a local oscillator 21 and have their phase shifts which are digitally controlled by the logic unit 20. Then, the signals given by the phase-shifter circuits are transposed in radiofrequency by being mixed in the frequency transposition circuits with a signal at a frequency $f_0-f_1$ where $f_0$ is the carrier frequency of the signal to be transmitted by the transmitter according to FIG. 3. This signal at the frequency $f_0-f_1$ is given by a local oscillator 22.

Figure 6:
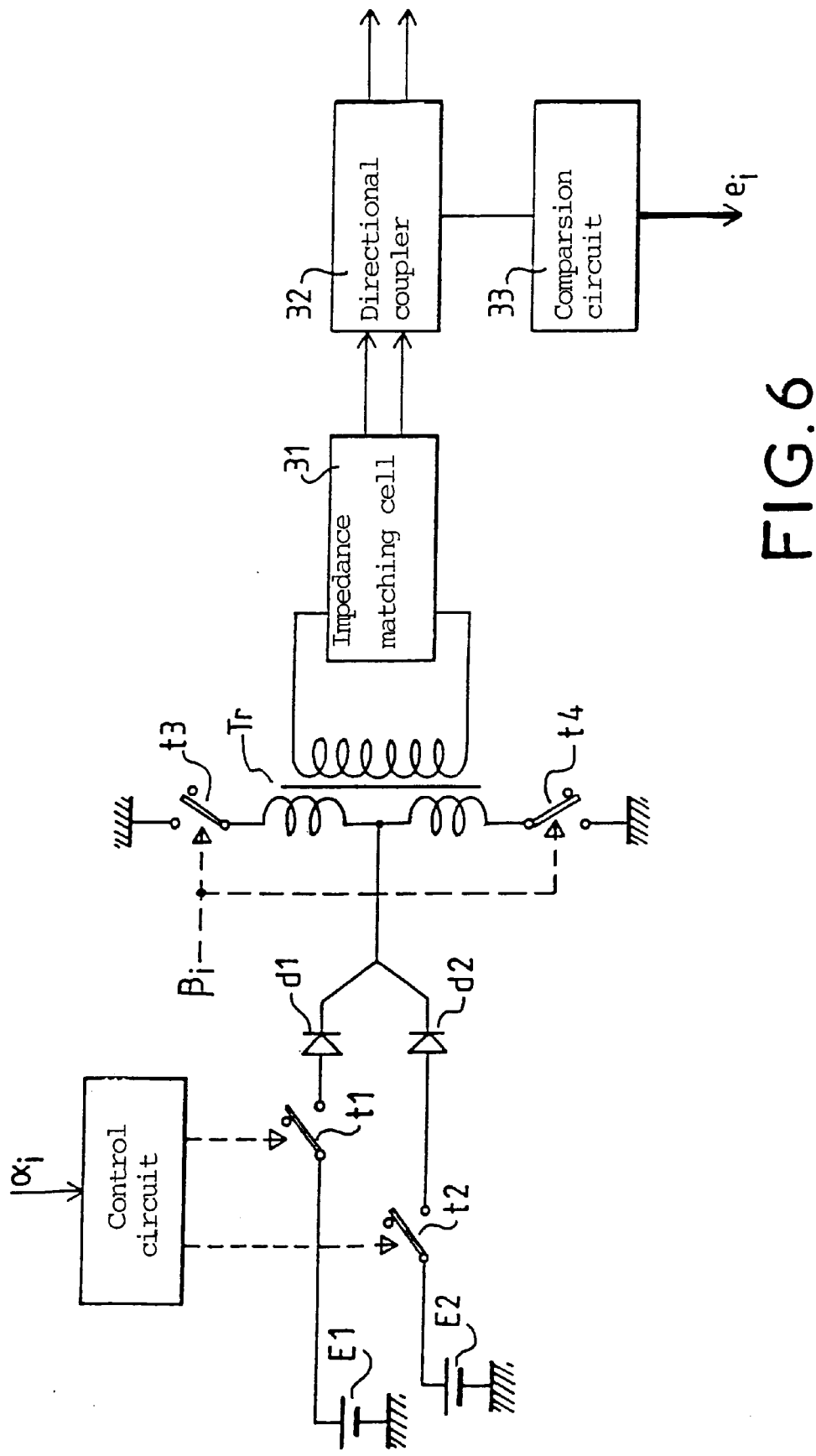

FIG. 6 is a schematic drawing of an amplification cell 3. This is any one of the cells $3_1$ to $3_n$ according to FIG. 3, given that all the cells are identical. In this figure, to facilitate understanding, the transistors used, working in selection switching mode, are shown in the form of switches with a control of the switch shown in dashes.

The amplification cell has two DC voltage sources E1, E2 with different values connected to the same midpoint of a primary winding of a transformer $T_r$ respectively by a switch $t_1$ followed by a diode d1 mounted in the forward direction for the source current E1 and by a switch t2 followed by a diode d2 mounted in the forward direction for the current from the source E2. The switches t1, t2, in the example described, are low-frequency transistors. They are controlled by a control circuit 30 which receives, at its input, the digital signal $\alpha_i$ for the selection of one of the three discrete levels of operation of the cell.

The ends of the primary winding of the transformer Tr are joined to the ground respectively through two switches t3, t4. These switches are controlled by the digital control signal $\beta_i$. The switches t3, t4 in the example described are two radiofrequency transistors working in selection-switch mode in a push-pull assembly.

The secondary winding of the transformer Tr has its ends connected to the two input terminals of an impedance matching and filtering circuit 31. The output of the circuit 31 is coupled to the input of a directional coupler 32. This coupler has a main output forming the output of the amplification cell and an ancillary output that is connected to the input of the comparison circuit 33. The output of the circuit 33 gives, among the digital signals E on the state of operation of the amplification cells, the signal $e_i$ which pertains to the amplification cell $3_i$ considered.

The amplification cell according to FIG. 6 works as follows.

Depending on the value of the digital signal $\alpha_i$ for the selection of one of the three discrete levels of operation of the cell, the control circuit 30:

leaves the switches t1 and t2 open, closes the switch t1, closes the switch t2.

The result thereof, from the viewpoint of the primary winding of the transformer Tr, is the arrival of a current whose values, as a function of the state of the switches t1 and t2, are respectively:

0, $I_1$, $I_2$ (with $I_2$ greater than $I_1$).

These three distinct current values determine the three discrete levels referred to here above.

The push-pull assembly with the two switches t3, t4 and the transformer Tr may thus, under the control of the radiofrequency signal $\beta i$, deliver an amplified radiofrequency signal. This signal, after passage in the circuit 31 and then in the coupler 32, gives the desired radiofrequency signal at the main output of the directional coupler 32. The coupler 32 is a measurement coupler whose role is to deliver a minute fraction of the output signal of the circuit 31 to the comparison circuit 33. After comparison with reference values, the circuit 33 can then give the digital signal ei on the state of the amplification cell 3i considered and, more specifically, it can indicate whether the cell is not capable of giving one or other of its discrete levels.

What is claimed is:

1. Method for preparing a transmission signal with an instantaneous amplitude A and an instantaneous phase $\phi_0$, by means of n amplification cells, with n as a whole number at least equal to 2, each amplification cell giving a whole number, at least equal to 2, of output discrete levels, including the level zero, characterized in that, considering the primary vector of the modulus A with an argument $\phi_0$, it consists in determining n secondary vectors with a vector sum equal to the primary vector, these secondary vectors being chosen in a one-to-one relationship with the n cells and each having a modulus with a value corresponding to one of the discrete levels of the cell with which it is in a one-to-one relationship and a phase, in controlling each of the n cells so that it gives a signal with instantaneous amplitude and phase whose values correspond respectively to the values of the modulus and of the argument of the secondary vector in a one-to-one relationship with the cell considered and in summing up, in an energy-coupling device, the signals given by the n cells.

2. Method according to claim 1 characterized in that, to determine the n vectors, it consists in choosing at least two cells to give levels other than zero and in choosing, in the n cells, respectively n levels such that the sum, which will hereinafter be called an intermediate sum, of the values of these n levels is at least at least equal to A and, should the intermediate sum be precisely equal to A, in choosing for each of the n vectors the argument $\phi_0$, and should the intermediate sum be greater than A, in choosing, for n−2 of the n vectors, the argument $\phi_0$ and, for two of the vectors in a one-to-one relationship with two cells chosen to give levels other than zero, arguments $\phi_0+\Delta\phi_1$ and $\phi_0+\Delta\phi_2$ such that the sum of the n secondary vectors is equal to the primary vector.

3. Method according to claim 2, characterized in that it consists in using amplification cells that are all identical.

4. Method according to claim 3, characterized in that it consists in using amplification cells for which the number of output levels is at least equal to 3 and in limiting itself, for the modules of the n secondary vectors, to two values corresponding respectively to two consecutive output levels.

5. Method according to claim 1, characterized in that it consists in using amplification cells that are all identical.

6. Method according to claim 5, characterized in that it consists in using amplification cells for which the number of output levels is at least equal to 3 and in limiting itself, for the modules of the n secondary vectors, to two values corresponding respectively to two consecutive output levels.

7. Transmitter for the transmission of a signal with an instantaneous amplitude A and an instantaneous phase $\phi_0$ comprising a radiofrequency oscillator, n amplification cells with n as a whole number at least equal to 2, each amplification cell giving a finite whole number, at least equal to 2, of output levels, including the zero level, a transmission antenna and an energy-coupling device to couple the antenna cells, characterized in that it comprises computation means to determine n vectors in a one-to-one relationship with the n cells such that their sum is equal to a vector with a modulus A and an argument $\phi_0$ and in that the modulus of each of them has a value equal to the value of one of the discrete levels of the cell with which the vector is in a one-to-one relationship, amplitude control means to impose, on each cell, the discrete level thus defined by the modulus of the vector associated with the cell considered and phase control means in order to impose on each cell, from the phase of the oscillator, a phase shift equal to the argument of the vector associated with the cell considered.

* * * * *

UNITED STATES PATENT AND TRADEMARK OFFICE
CERTIFICATE OF CORRECTION

PATENT NO.    : 6,658,238 B1
DATED         : December 2, 2003
INVENTOR(S)   : Ursenbach et al.

Page 1 of 1

It is certified that error appears in the above-identified patent and that said Letters Patent is hereby corrected as shown below:

<u>Title page,</u>
Item [86], PCT No.: and Date should read:

-- [86]   PCT No.:  PCT/FR99/01599

§ 371 (c )(1),
(2), (4) Date:   Jan. 10, 2001 --

Signed and Sealed this

Second Day of March, 2004

JON W. DUDAS
*Acting Director of the United States Patent and Trademark Office*